United States Patent [19]

Walker

[11] Patent Number: 4,631,928
[45] Date of Patent: Dec. 30, 1986

[54] JOULE-THOMSON APPARATUS WITH TEMPERATURE SENSITIVE ANNULAR EXPANSION PASSAGEWAY

[75] Inventor: Graham Walker, Scottsdale, Ariz.

[73] Assignee: General Pneumatics Corporation, Orange, N.J.

[21] Appl. No.: 793,268

[22] Filed: Oct. 31, 1985

[51] Int. Cl.[4] .............................................. F25B 19/00
[52] U.S. Cl. ............................. 62/514 JT; 137/614.11; 236/101 R
[58] Field of Search ................ 62/514 JT; 236/101 R; 137/614.11

[56] References Cited

U.S. PATENT DOCUMENTS

| | | | |
|---|---|---|---|
| 2,675,829 | 4/1954 | Livers | 137/614.11 |
| 3,320,755 | 8/1967 | Jepsen et al. | 62/45 |
| 3,457,730 | 11/1969 | Berry et al. | 62/223 |
| 3,517,525 | 7/1970 | Campbell | 62/222 |
| 3,827,252 | 8/1974 | Chovet et al. | 62/222 |
| 4,002,039 | 6/1977 | Cramer et al. | 62/224 |
| 4,028,907 | 4/1977 | Herrington et al. | 62/222 |
| 4,056,745 | 11/1977 | Eckels | 62/514 JT |
| 4,177,650 | 3/1979 | Campbell | 62/222 |
| 4,206,760 | 6/1980 | Davis | 128/303 |
| 4,237,699 | 9/1980 | Longsworth | 62/514 |
| 4,278,090 | 7/1981 | van Gerven | 62/514 JT |
| 4,419,867 | 10/1983 | Albagnac | 62/514 |
| 4,468,935 | 9/1984 | Albagnac | 62/514 JT |
| 4,484,002 | 5/1984 | Klee et al. | 236/101 R |

FOREIGN PATENT DOCUMENTS

| 515003 | 9/1976 | U.S.S.R. . |
|---|---|---|
| 700756 | 11/1979 | U.S.S.R. . |
| 757814 | 8/1980 | U.S.S.R. . |

Primary Examiner—Ronald C. Capossela
Attorney, Agent, or Firm—Shapiro and Shapiro

[57] ABSTRACT

A self-regulated Joule-Thomson expansion valve and cryostat useful in miniaturized cryogenic gas liquefaction systems include a substantially frustroconical valve member having a base portion supported at the end of first means such as an elongate shaft and a tapered valve seat generally complementary to the valve member and supported circumferentially adjacent a lengthwise portion of the valve member by second means such as a sheath slidably received upon the shaft. The valve member and valve seat taper down toward a free extremity of the valve member, whereby opposing peripheral surfaces of the valve member and valve seat define a converging annular passageway terminating at an annular expansion opening. The first means is constructed with an effective coefficient of thermal expansion lower than that of the second means so that the valve seat moves axially toward and away from the valve member by differential contraction and expansion between the first and second means in response respectively to decreases and increases in the temperature of expanded coolant gas, thus regulating the effective flow area of the converging annular passageway. The valve member may advantageously include labyrinth flow spoilers in the form of circumferential grooves which serve additionally as catchment reservoirs for capturing contaminants contained in the coolant gas, thus rendering the expansion valve highly resistant to blockage by such contaminants. Means may also be provided for adjusting the relative axial positions of the valve member and valve seat in order to calibrate the effective flow area of the converging passageway.

35 Claims, 5 Drawing Figures

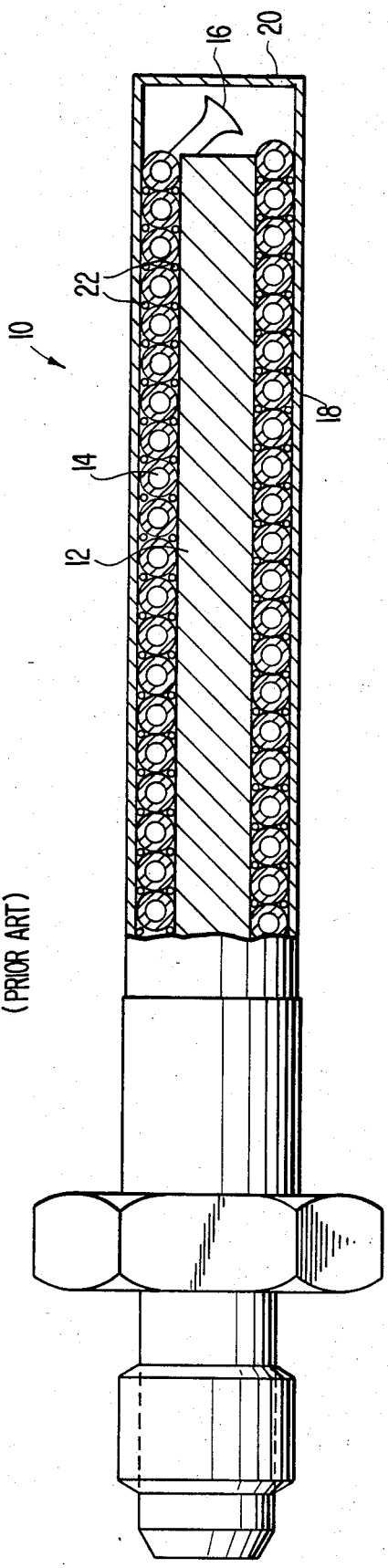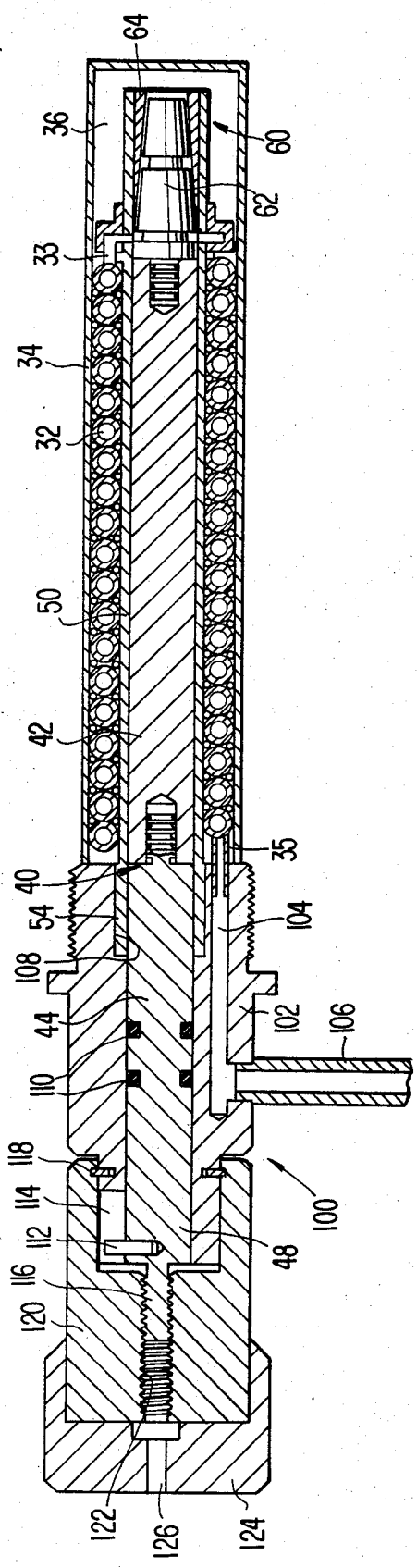
FIG. 1. (PRIOR ART)
FIG. 2.

JOULE-THOMSON APPARATUS WITH TEMPERATURE SENSITIVE ANNULAR EXPANSION PASSAGEWAY

FIELD OF THE INVENTION

This invention relates generally to cryogenic cooling apparatus for gas liquefaction and is more particularly concerned with an improved Joule-Thomson expansion valve and a cryostat employing the same. The invention is especially useful in connection with miniature Joule-Thomson cooling systems.

DESCRIPTION OF THE PRIOR ART

Gases may be cooled below their liquefaction temperatures by expanding from a high pressure to a low pressure in a constant enthalpy process known as Joule-Thomson expansion. When the temperature of the gas just prior to expansion is sufficiently below the inversion temperature of the gas (the temperature below which expansion results in a decrease in temperature), the gas undergoes a phase change upon expansion, forming two distinct fluids—saturated liquid (the useful product) and saturated vapor. The expansion of gases in this manner is generally effected by a so-called Joule-Thomson expansion valve.

The present invention is especially applicable to miniature liquefiers of the Linde-Hampson class, which customarily employ cryostats including a Joule-Thomson expansion valve made integral with a final stage contra-flow, recuperative heat exchanger (usually referred to as a Giaque-Hampson heat exchanger). FIG. 1 illustrates a conventional cryostat of the foregoing type. The cryostat, designated by reference numeral 10, includes an elongate mandrel or core 12 about which a length of fine bore finned tubing 14 is helically wound. The tube 14 terminates at an end 16 having a fixed opening which is partially restricted and which constitutes the Joule-Thomson expansion orifice. The wound tubing 14 and Joule-Thomson orifice 16 are contained in a sheath 18 closed at one end 20 which corresponds to the cold end of the device. Usually the sheath will be incorporated as part of a dewar vessel and the previously described components will be inserted therein.

In operation of cryostat 10, high pressure coolant fluid (gas) is supplied to expansion orifice 16 through tubing 14. The non-liquefied portion of the coolant fluid flows back along the heat exchanger (to the left in FIG. 1) to pre-cool the incoming gas and is then recycled through the cooling system. Spacer strands 22 are ordinarily wrapped about the core 12 and the inner periphery of the sheath 18, between adjacent passes of the finned tubing 14 so that the non-liquefied coolant flows between the fins of the tubing 14 for good heat exchange. Liquefied coolant is removed (as through an opening in the sheath) as useful product.

Cool-down of the device just described takes place basically as follows. Initially, assuming the incoming high pressure gas is at a temperature below the inversion temperature, the gas will expand through the Joule-Thomson orifice to a lower temperature. At start-up the initial temperature of the gas is not sufficient low to form liquid. All of the expanded gas will thus be returned along the finned tubing heat exchanger for recycling. As the cool expanded gas flows along the heat exchanger, it absorbs heat from further incoming gas which is thus pre-cooled. The further gas will therefore expand from a lower temperature than did the initial gas and will therefore attain a lower post-expansion temperature. It then pre-cools yet additional incoming gas to an even lower pre-expansion temperature, and so on. This bootstrapping process continues until the incoming gas is pre-cooled sufficiently below the inversion temperature that a liquid component is formed, whereafter the system reaches equilibrium with the liquid being removed and additional gas being supplied as makeup.

Conventional fixed orifice Joule-Thomson devices such as that in FIG. 1 suffer from two significant disadvantages in practice. First, due to the fixed expansion orifice, such devices are characterized by slow initial cool-down and poor temperature regulation. More particularly, with a fixed orifice the fluid mass flow rate increases as cool-down progresses. Increasing flow, however, is precisely opposite the criteria for rapid cool-down and good temperature regulation (i.e., maintaining an even temperature). To achieve these objectives it is necessary that the initial flow rate be at a maximum (for rapid cooling), followed by a reduction in flow as the temperature approaches design conditions, and even temporary stoppage of the flow if necessary to maintain the design temperature.

A second major problem with fixed orifice Joule-Thomson systems is clogging caused by the accumulation of condensed contaminants from the coolant fluid stream. More particularly, as the incoming gas expands through the Joule-Thomson orifice, contaminants contained in the gas stream condense, freeze and then accumulate in the orifice—eventually leading to complete blockage of the flow. The flow is thereafter restored when the temperature of the device rises sufficiently that the contaminants melt and are discharged by the pressure of the coolant gas.

A number of Joule-Thomson expanders have been proposed in the prior art which include mechanisms for throttling the gas flow to improve upon the temperature characteristics of fixed orifice devices. Temperature responsive needle valves are perhaps the most commonly proposed mechanism for this purpose. Various arrangements have been devised to impart the required temperature sensitivity to the needle valve, including, for example, temperature responsive bellows arrangements and assemblies incorporating structural components having different coefficients of thermal expansion. Generally, these devices have been quite complex, due largely to the required structure for moving the needle element into and out of the expansion opening. These devices also frequently exhibit poor temperature sensitivity. Moreover, needle valve type devices are susceptible to blockage by condensed contaminants.

SUMMARY OF THE INVENTION

In accordance with the present invention, the above noted and other disadvantages of the prior art are eliminated by expansion of the coolant fluid through a converging annular passageway which terminates at an annular expansion opening, the effective flow area of the passageway being adjustable in response to changes in temperature of the coolant fluid. More particularly stated, in accordance with one of its broad aspects, the invention provides a Joule-Thomson expansion valve comprising first means supporting a substantially frustro-conical valve member at a base portion of the valve member and second means supporting a tapered valve seat circumferentially adjacent a lengthwise portion of the valve member. The valve seat converges toward a free end of the valve member opposite the base portion of the valve member, whereby opposing surfaces of the valve member and the valve seat define a converging annular passageway which terminates at an annular expansion opening adjacent the free end of the valve member. The device also includes means for introducing high pressure coolant fluid into the passageway at a location upstream of the expansion opening and further includes temperature responsive means for drawing the valve seat axially toward the base portion of the valve member in response to decreases in temperature of the coolant fluid in order to reduce the effective flow area of the passageway and for withdrawing the valve seat axially away from the base portion of the valve member in response to increases in temperature of the coolant fluid in order to increase the effective flow area of the passageway.

In preferred practice of the invention, the expansion valve includes labyrinth spoiler means for causing degradation in the coolant fluid flow through the passageway. The spoiler means may be in the form of one or more circumferential grooves in the outer peripheral surface of the frustro-conical valve member, the grooves serving also as catchment reservoirs for capturing contaminants contained in the coolant fluid. The temperature responsive means is constituted by different effective coefficients of thermal expansion of the first means and second means, the effective coefficient of thermal expansion of the first means being less than that of the second means.

In a preferred embodiment, the first means includes elongated shaft means having first and second ends with the valve member being supported at the first end of the shaft means. The second means includes elongate sheath means surrounding the shaft means along a major portion of the length of the shaft means, the sheath means having first and second ends, with the tapered valve seat being supported at the internal periphery of the first end of the sheath means. The respective second ends of the shaft means and sheath means are held in selected relative longitudinal positions by suitable holding means. The holding means may be adjusted to vary the selected positions in order to permit calibration of the converging annular passageway.

In accordance with another broad aspect of the invention, there is provided a Joule-Thomson cryostat comprising a substantially cylindrical core shaft with a substantially frustro-conical tip at one end of the core shaft, the tip having a free extremity of smaller cross dimension than a base portion of the tip. The cryostat further includes a tubular sheath slidably received over the core shaft and having at one end an internal peripheral valve seat surrounding, in spaced relation, a lengthwise portion of the frustro-conical tip. The valve seat tapers from a larger cross dimension toward the base portion of the tip to a smaller cross dimension toward the free extremity of the tip, whereby opposing surfaces of the tip and the valve seat define a converging annular passageway terminating at an annular expansion opening adjacent the free extremity of the tip. Respective ends of the core shaft and sheath opposite the tip and seat supporting ends thereof are held in selected relative longitudinal positions by a holding means, and coolant fluid tubing is helically wrapped about the sheath and has an end in communication with the converging annular passageway for introducing high pressure coolant fluid into the passageway at a location upstream of the expansion opening. The core shaft has a coefficient of thermal expansion less than that of the sheath, whereby the effective flow area of the passageway is adjustable by relative longitudinal movement of the tip and valve seat as a result of differential expansion and contraction between the core shaft and sheath in response to changes in temperature of the coolant fluid.

BRIEF DESCRIPTION OF THE DRAWINGS

Further details of the invention as well as its advantages will be apparent from the ensuing description of the preferred embodiments taken in conjunction with the drawings, wherein:

FIG. 1 is a side view, shown partly in section, of a cryostat in accordance with the prior art;

FIG. 2 is a cross-sectional side view of a cryostat in accordance with the invention;

DESCRIPTION OF THE PREFERRED EMBODIMENTS

Figure 3:
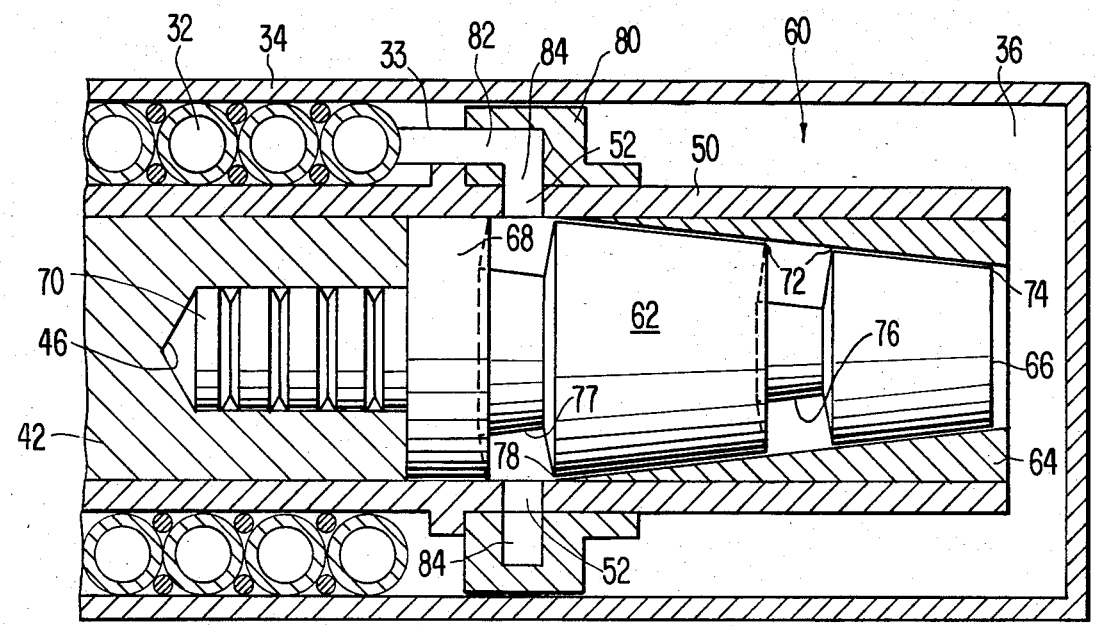
FIG. 3 is an enlarged cross-sectional view of the expansion valve portion of the cryostat of FIG. 2.

FIG. 2 depicts a cryostat 30 incorporating a Joule-Thomson expansion valve 60 in accordance with the present invention. In the illustrative embodiment, expansion valve 60 includes a substantially frustro-conical valve member 62 supported at an end of first means in the form of elongate core shaft 40 of substantially cylindrical cross section. For purposes which will become apparent hereinafter the core shaft 40 includes a main section 42 having the valve member 62 and an extension 44 supported at its opposite ends, as shown.

Expansion valve 60 further includes a tapered valve seat 64 supported circumferentially adjacent a lengthwise portion of valve member 62 by second means in the form of a tubular sheath 50 slidably received over and coaxial with the core shaft 40. Sheath 50 surrounds core shaft 40 along the major portion of the core shaft length, as shown. Core shaft 40 and sheath 50 constitute, in part, a mandrel about which finned coolant fluid tubing 32 is wrapped and secured in a conventional manner. One end 33 of tubing 32 is connected to the expansion valve 60 in a manner to be described later. As will be explained in detail hereinafter, the core assembly constituted by shaft sections 42 and 44 and valve member 62 is constructed to have a lower effective coefficient of thermal expansion than the sheath 50 in order to render valve 60 adjustable in response to the temperature of the fluid expanded from the valve 60.

With continued reference to FIG. 2, it will be seen that the heat exchanger and expander portions of cryostat 30 are contained within an outer sheath 34 in the form of a cylinder which is closed at one end. The closed end of outer sheath 34 defines an expansion chamber 36 for gas exiting valve 60 and from which liquefied coolant gas may be recovered by suitable conventional means (not shown). The non-liquefied portion of the expanded coolant gas flows back along the wrapped tubing 32, between sheath 50 and outer sheath 34, and absorbs heat from incoming high pressure gas within the tubing, whereby the incoming gas is pre-cooled prior to expansion. The expanded gas then exits from an outlet (not shown) at the open end of the outer sheath 34.

It will be appreciated that in practice, outer sheath 34 will ordinarily be incorporated into a dewar vessel employed in conjunction with the cryostat 30 for containing the liquefied product and that the heat exchanger and Joule-Thomson expander portions of the cryostat will be inserted into the sheath, which is illustrated herein to facilitate understanding of the invention.

The structural details of Joule-Thomson expansion valve 60 will now be described. Referring additionally to FIG. 3, the generally frustro-conical valve member 62 will be seen to converge toward a free extremity 66 thereof from a base portion 68 which is attached to main section 42 of core shaft 40. The outer periphery of the base portion 68 of the valve member is non-tapered to conform to the inner circumference of tubular sheath 50, with the free extremity 66 being of reduced cross dimension relative to the base portion 68. Valve member 62 is attached to the main section 42 of the core shaft by means of an a pin 70 projecting axially from the base portion 68 and received in a corresponding socket 46 at the associated end of core shaft section 42. Pin 70 may be externally grooved, as shown, to facilitate fixation of the valve member 62 to core shaft section 42 (e.g., to receive an epoxy adhesive). Valve member 62 may also be formed integrally with core section 42.

Valve seat 64 essentially has the form of an annular wedge which converges from a wider cross dimension toward base portion 68 of the valve member to a narrower cross dimension toward free extremity 66 of the valve member. To simplify manufacturing of the valve 60, the valve seat 64 may be formed as a separate element which is inserted and secured within the inner periphery of sheath 50, although the seat may, of course, be formed integrally with sheath 50.

In accordance with the invention as shown in FIG. 3, valve member 62 and valve seat 64 are arranged with their opposing peripheral surfaces spaced slightly apart to define an annular passageway 72 which converges toward free extremity 66 of valve member 62 and terminates at an annular expansion opening 74 adjacent the free extremity 66 of the valve member. Passageway 72 of the illustrative embodiment is interrupted along its length by one of a pair of circumferential grooves 76, 77 which are cut into the external peripheral surface of valve member 62. The grooves 76, 77 (which, in the form shown, are cut substantially perpendicular to the valve member surface) serve two very important practical purposes which will be discussed shortly.

To permit the introduction of high pressure gas into valve 60, sheath 50 includes peripheral openings 52 in communication with an upstream end 78 of converging annular passageway 72. In the form shown, the openings 52 are aligned with spoiler groove 77 adjacent end 78 of the passageway 72. Coolant gas is fed into the aligned groove, and thus the passageway, through openings 52 by means of an annular high pressure adapter 80 secured to the outer periphery of sheath 50. High pressure adapter 80 is provided with an opening 82 wherein end 33 of tubing 32 is received, and an internal peripheral channel or groove 84 in communication with both opening 82 of the adapter and openings 52 of the sheath.

Referring again to FIG. 2, it will be seen that at the end of the cryostat 30 opposite expander 60 (i.e., at the "warm" end of the cryostat) the ends of core shaft 40 and sheath 50 are connected to a calibration assembly 100 which holds the core shaft and sheath in selected relative axial positions. The selected positions of the core and sheath are adjustable in a manner to be described later.

Given the basic structure of cryostat 30 as described hereinabove, the purpose of constructing the core assembly 42, 44, 62 so as to have a lower effective coefficient of thermal expansion than sheath 50 will be readily understood. In particular, it will be appreciated that as the temperature of the cryostat 30 decreases, the sheath will contract more rapidly than the core assembly. As a result, valve seat 64 is drawn axially over valve member 62 in the direction of base portion 68 (to the left in FIGS. 2 and 3). The clearance between the opposing peripheral surfaces of valve member 62 and valve seat 68 is therefore reduced, thus decreasing the effective flow area of converging annular passageway 72. Conversely, as the temperature of the coolant fluid increases, sheath 50 expands more rapidly than the core assembly, thereby withdrawing the valve seat axially away from the valve member (to the right in FIGS. 2 and 3). This action increases the clearance between the opposing peripheral surfaces of the valve member and seat, thus increasing the effective flow area of converging passageway 72. The differential longitudinal contraction and expansion between the core assembly and sheath as just described is accompanied by differential diametric contraction and expansion between the expansion valve elements 62 and 64, which contributes to the temperature sensitivity of the converging passageway 72.

As noted earlier, the grooves 76, 77 cut into the surface of valve member 62 serve two particularly important purposes. First, the grooves act as labyrinth spoilers, causing degradation in the coolant fluid flow through the Joule-Thomson valve to enhance the pressure difference between the inlet and outlet sides of the valve. Second, the grooves act as catchment reservoirs for capturing contaminants contained in the coolant gas stream. The effect of the spoilers as catchment reservoirs is of substantial practical significance in that the expansion valve 60 is thereby rendered highly resistant to clogging by condensed contaminants. The resistance to blockage results in highly reliable long-term operation, making the invention especially suitable for applications in which maintenance requirements must be kept to a minimum. Additionally, because the design of valve 60 is less susceptible to blockage, the valve can operate with coolant gases of far lower purity than can be employed in conventional Joule-Thomson devices. The high purity requirements of conventional devices increase the costs of not only the coolant fluid, but of the entire associated cryogenic cooling system as well (due to the need for filtration, as well as other accommodations).

In practice of the invention, a number of grooves other than 2 may be employed depending upon the requirements of a given application. Indeed, for some applications adequate performance may be obtained without the grooves being present, as the converging annular passageway is itself more resistant to blockage than a circular expansion orifice. The presence of the grooves is contemplated as a general rule, however, due to the significant advantages which they provide.

Referring again to FIG. 2, in order that cryostat 30 may accommodate prescribed flow criteria for particular applications, holding means assembly 100 is adjustable so that core shaft 40 and sheath 50 may be held in selected relative axial positions. More particularly, assembly 100 permits adjustment of the positional relationship between respective ends 48 and 54 of the core and sheath opposite valve 60 in order to vary the clearance between the opposing peripheral surfaces of valve member 62 and valve seat 64. By varying the aforementioned clearance, the effective flow area of converging annular passageway 72 may be calibrated.

In the embodiment of FIG. 2, the adjustable means 100 includes an adapter member 102 which is of a generally tubular configuration and slidably received over the core extension 44. The adapter 102 has an eccentric bore 104 connecting an inlet end 35 of tubing 32 to a coolant fluid supply line 106, as shown. Adapter 102 further has a central bore with a forward end portion of enlarged diameter, as indicated at 108, wherein the end 54 of sheath 50 is secured. O-ring seals 110 are placed in corresponding circumferential grooves in extension 44 to provide a seal between the periphery of extension 44 and the inner peripheral surface of adapter 102 and thereby prevent coolant gas leakage past end 54 of sheath 50 along the opposed peripheral surfaces of core extension 44 and adapter 102.

Adapter 102 and core extension 44 have key and keyway means 112, 114 cooperable therebetween, the key 112 being in form of a pin which is partially inserted in a socket in core extension 44 and partially located in keyway 114 in adapter member 102. The key and keyway means 112, 114 permits relative longitudinal movement between core shaft 40 and adapter 102 but prevents relative rotational movement between these elements.

For effecting calibrating movement between core shaft 40 and sheath 50 (more specifically, valve member 62 and valve seat 64) an adjustment member 120 has a longitudinal bore 122 which threadably receives a threaded end pin 116 of core extension 44. Adjustment member 120 is also connected to adapter 102 by means of a retainer clip 118, which may be a C-clip, cooperable between opposing grooves in the internal periphery of adjustment member 120 and the external periphery of adapter 102, as shown. Adjustment member 120 functions as a turnbuckle, with C-clip 118 acting to permit rotation of the adjustment member about the axis of core shaft 40 and to maintain adapter 102 and adjustment member 120 in axially fixed relation.

To adjust converging annular passageway 72 for calibration, adjustment member 120 is rotated about the axis of core shaft 40. By virtue of C-clip 118, there is no axial displacement of adjustment member 120 relative to adapter 102. However, due to the threaded engagement of adjustment member 120 with core shaft extension 42 and the cooperation of key and keyway means 112, 114, the core shaft (specifically, extension 44) is caused to slide within adapter member 102. Because sheath 50 is fixedly secured to adapter 102 (and slidably received over the core shaft 40), the foregoing sliding movement of the core shaft results in axial displacement of the core shaft 40 relative to sheath 50, thereby causing a corresponding change in clearance between valve member 62 and valve seat 64.

Once the desired setting of converging annular passageway 72 has been attained, the adjustment member 120 may be locked in place by means of a locking cap 124 which fits over a rear end of adjustment member 120, as shown. Locking cap 124 includes a central threaded plug 126 which threads into bore 122 from the rear. Locking cap 124 is rotated until plug 126 is threaded into endwise abutment with pin 116 of core extension 44, thus providing a locking effect. It will be apparent that the calibration assembly 100 offers the significant advantage of adjustability during operation of the cryostat 30.

Insofar as particular materials of construction are concerned, it will be apparent to those skilled in the art that many combinations of materials may be employed to implement the present invention. However, certain desirable characteristics for the various structural elements should be considered. For the frustro-conical valve member 62, a hard material, resistant to the erosive effects of the high speed gas flow through the converging annular passageway is desirable. The material for the valve member should also have a low coefficient of thermal expansion. Invar, a hard metal composed of 34% nickel and 66% iron, is exemplary of suitable materials for the valve member. For the main core section 42, a material having a low coefficient of thermal expansion and low thermal conductivity is desirable—for example, glass reinforced epoxy composites, one such composite being G-10 which is a thermosetting plastic with 10% glass fiber reinforcement. G-10 is readily available commercially, one source being Synthane-Taylor of Laverne, Calif. (which supplies this material under the designation G-10CR).

Regarding sheath 50, a high coefficient of thermal expansion and high thermal conductivity are desirable. 7075-T6 aluminum may be employed for both the sheath 50 and valve seat 64. The coefficient of expansion of this particular aluminum is relatively small, generally speaking, but the dimensional changes achievable with this material are significant within the fine tolerances employed in miniature Joule-Thomson expanders.

The basic components 102, 120, and 124 of the calibration assembly 100 may suitably be constructed of 303 stainless steel or the like, and it is therefore advantageous for core extension 44 to be made of the same material. More particularly, because stainless steel is more easily machined than G-10 to form the necessary features for coupling the core to the calibration assembly, the use of a separate core extension which is attached to the main core section can be advantageous. The O-ring seals 110 of the calibration assembly may be made of TEFLON.

Without limiting the invention, exemplary construction parameters which may be employed are as follows:
Valve Member (Invar):
    0.412" total length
    0.312" length base to free end
    0.05" diameter at free end
    0.09" diameter of base portion
    9°–10° apex angle
    0–4 spoilers (0.015" depth, 0.02" width)
Main Core Section (G-10):
    1.66" length
    0.09" diameter
Core Extension (303 stainless steel):
    0.80" length
    0.09" diameter
Sheath (7075-T6 Al):
    2.125" length
    0.0935" inner diameter
    0.113" outer diameter (0.125" at enlarged end)
Valve Seat (7075-T6 Al):
    0.235" length
    0.0932" inner diameter converging to 0.05"
    10° included angle
High Press. Adapter (7075-T6 Al): 0.07" length
    0.1135" inner diameter Calib. Adapter Memb. (303 stainless steel):
  0.375" length
  0.0935" inner diameter (0.125" at enlarged end)
Adjustment Member (303 stainless steel):
  0.375" length
  72 bore thread pitch For securing the various elements of cryostat 30 to one another, soft soldering is the preferred technique for strength and durability. However, the invention has been successfully implemented using other means of attaching the components, in particular, epoxy adhesive.

It will be appreciated, of course, that construction parameters may vary substantially from case to case, depending upon the requirements of particular applications. For example, for typical applications the apex angle defined by the converging peripheral surface of the frustro-conical valve member may be in the range from about 5° to about 30°, with the included angle of the converging peripheral surface of the valve seat being in the same range and generally complementary to the taper of the valve member. The larger angles will, of course, produce a greater change in the effective area of the converging annular passageway 72 for a given amount of contraction of sheath 50 relative to core assembly 40, 62. To prevent the opposing surfaces defining the passageway from sticking to one another upon complete closure of the valve (i.e., when the seat has been drawn over the valve member sufficiently to bring the opposing surfaces into contact), the apex angle of the valve member may advantageously be made up to about 1° less than the included angle of the valve seat, preferably at least about ¼° less.

Figure 4:
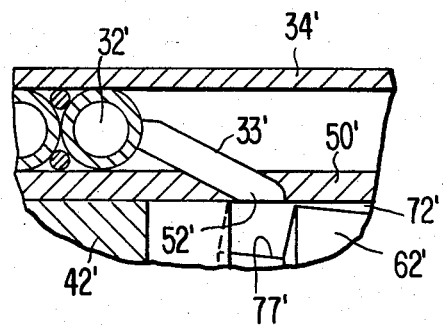
FIG. 4 is a fragmentary sectional view showing details of an alternative embodiment of the invention.
Figure 5:
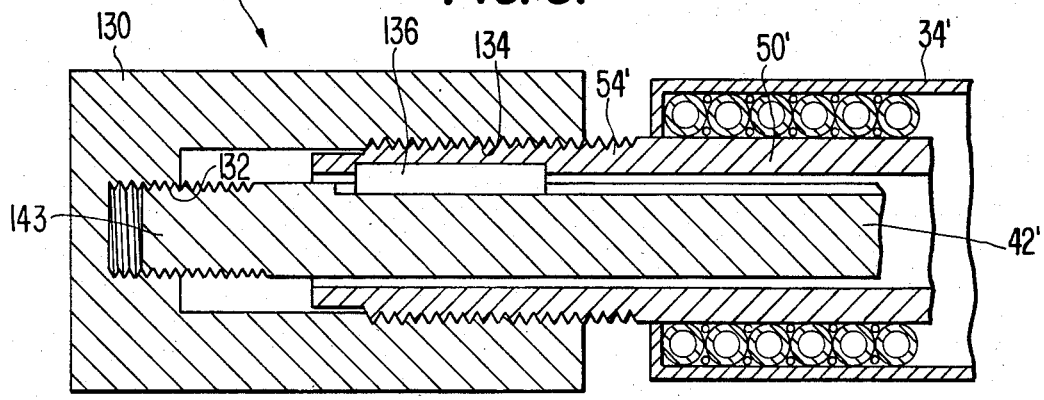
FIG. 5 is a fragmentary sectional view showing details of yet another embodiment of the invention.

Turning now to FIGS. 4 and 5, wherein elements corresponding to those in FIGS. 2 and 3 are indicated by corresponding reference numerals, two additional embodiments of the invention will now be described. FIGS. 4 and 5 respectively depict an alternative form of attachment of the coolant fluid supply tubing end to the Joule-Thomson expander and an alternative calibration mechanism for the expander.

In the apparatus of FIG. 4, the high pressure adapter 80 has been eliminated by direct connection of tube end 33' to the Joule-Thomson expander. In particular, tube end 33' is inserted into an opening 52' in sheath 50', the opening being aligned with a labyrinth spoiler groove 77' to ensure even distribution of incoming coolant fluid into the upstream end of converging annular passageway 72'.

FIG. 5 depicts a differential thread type calibration mechanism 100' according to the invention. In this embodiment, main core section 42' (there is no core extension) has an end pin 143 externally threaded at a first pitch (e.g., 40 threads per inch), whereas sheath end 54' is threaded externally at a different pitch (e.g., 39 threads per inch). The respective threads of core and sheath portions 143 and 54' are threaded in the same rotational sense (e.g., both right-handed threads). An adjustment member 130 in the form of a thimble has threaded bores 132 and 134 which receive the ends of the core and sheath, respectively. The core and sheath are coupled by cooperable key and keyway means, indicated diagrammatically at 136, which permits relative axial movement between the core and sheath but prevents relative rotational movement therebetween. Hence, upon each full rotation of thimble 130 about the axis of the core shaft, the core shaft and sheath are axially displaced relative to one another by an amount equal to the difference in the respective thread pitches of the two members—here, 0.02564" (1/39") less 0.025" (1/40") or 0.00064". It will be appreciated that the foregoing calibration assembly 100' is adjustable during operation of the associated cryostat.

While the invention has hereinabove been described in connection with several preferred embodiments, it will be apparent to those skilled in the art that various changes and modifications are possible consistent with the principles of the invention, the scope of which is defined in the appended claims. Within its broader range of applicability, exemplary practical uses of the invention could include condensation of vapor boil-off from liquid hydrogen and oxygen fuel supplies stored on spacecraft in insulated dewar vessels at cryogenic temperatures, and the liquefaction of helium and nitrogen for conventional industrial, medical, research, and defense applications.

In comparative tests (using nitrogen) of prototype cryostats in accordance with the invention against a conventional fixed orifice type cryostat, the devices according to the invention exhibited rapid cool-down and smooth temperature regulation and achieved hours of continuous operation without blockage by condensed contaminants. The conventional device, on the other hand, required substantially greater cool-down time, was poorly temperature regulated, and experienced blockage by condensed contaminants in as little as 6–60 minutes of continuous operation depending on test conditions. Devices in accordance with the invention have tested successfully under a variety of conditions, including inlet gas pressures of 1000–3000 psi and initial gas flow rates of 15–30 lpm, with typical cool-down periods being on the order of only one minute.

The invention claimed is:

1. Joule-Thomson expansion valve apparatus, comprising first means supporting a substantially frustro-conical valve member at a base portion of said valve member; second means supporting and retaining a tapered valve seat circumferentially adjacent a lengthwise portion of said valve member, said valve seat converging along said lengthwise portion toward a free end of said valve member opposite said base portion of said valve member and of reduced diameter relative to said base portion of said valve member, whereby opposing peripheral surfaces of said valve member and said valve seat define an annular passageway converging toward a terminal annular expansion opening adjacent said free end of said valve member; means for introducing high pressure coolant fluid into said passageway at a location upstream of said expansion opening; and temperature responsive means for drawing said valve seat longitudinally toward said base portion of said valve member in response to decreases in temperature of said fluid in order to reduce the effective flow area of said passageway and for withdrawing said valve seat longitudinally away from said base portion of said valve member in response to increases in temperature of said fluid in order to increase the effective flow area of said passageway, whereby coolant fluid flow through said passageway is adjustable in response to changes in temperature of said fluid.

2. Apparatus in accordance with claim 1, including labyrinth spoiler means for causing degradation in coolant fluid flow through said passageway.

3. Apparatus in accordance with claim 1, wherein said valve member includes means for capturing contaminants contained in said coolant fluid.

4. Apparatus in accordance with claim 3, wherein said capturing means includes a circumferential groove in said valve member at a position along the length of said passageway.

5. Apparatus in accordance with claim 1, wherein said temperature responsive means includes different effective coefficients of thermal expansion of said first means and said second means, respectively, the effective coefficient of thermal expansion of said first means being less than that of said second means.

6. Apparatus in accordance with claim 5, wherein said first means includes elongate shaft means having first and second ends, said valve member being supported at said first end of said shaft means, wherein said second means includes elongate sheath means surrounding said shaft means along a major portion of the length of said shaft means, said sheath means having first and second ends with said tapered valve seat being supported at the internal periphery of said first end of said sheath means, said apparatus further including means for holding said second ends of said shaft means and said sheath means in selected relative longitudinal positions.

7. Apparatus in accordance with claim 6, wherein said holding means includes means for adjusting said selected positions.

8. Joule-Thomson expansion valve apparatus, comprising elongate core means including a substantially frustro-conical tip at one end of said core means, said tip converging toward a free extremity thereof having a reduced diameter relative to a base portion of said tip; elongate sheath means surrounding a portion of said core means for relative movement longitudinally of said core means, said sheath means including at one end thereof an internal peripheral valve seat disposed circumferentially about said frustro-conical tip of said core means, said valve seat being tapered generally complementary to said frustro-conical tip and constructed to come into circumferential contact with an outer peripheral surface portion of said tip, with opposing peripheral surfaces of said valve seat and said tip defining a converging annular passageway terminating at an annular outlet opening adjacent said free extremity of said tip; and means for introducing coolant fluid into said passageway at a location upstream of said outlet opening, said core means having an effective coefficient of thermal expansion less than that of said sheath means, whereby said sheath means is movable longitudinally relative to said core means by differential expansion and contraction between said sheath means and said core means so as to adjust the effective flow area of said passageway in response to changes in temperature of said coolant fluid.

9. Apparatus in accordance with claim 8, including labyrinth spoiler means for causing degradation in coolant fluid flow through said passageway.

10. Apparatus in accordance with claim 8, including means disposed along the length of said passageway for capturing contaminants contained in said coolant fluid.

11. Apparatus in accordance with claim 10, wherein said capturing means comprises a circumferential groove in said valve member.

12. Apparatus in accordance with claim 11, wherein said capturing means includes a plurality of said grooves.

13. Apparatus in accordance with claim 8, wherein said frustro-conical tip defines an apex angle in the range of about 5° to about 30° and wherein said tapered seat defines an included angle in the range from about 5° to about 30°.

14. Apparatus in accordance with claim 13, wherein said apex angle and said included angle are equal.

15. Apparatus in accordance with claim 13, wherein said apex angle is slightly less than said included angle.

16. Apparatus in accordance with claim 15, wherein said apex angle is from about $\frac{1}{4}$° to about 1° less than said included angle.

17. Apparatus in accordance with claim 8, including means for holding respective ends of said core means and said sheath means opposite said one ends thereof in selected relative longitudinal positions.

18. Apparatus in accordance with claim 17, wherein said holding means includes means for adjusting said selected positions.

19. Apparatus in accordance with claim 18, wherein said core means includes a shaft having said tip at one end of said shaft and having an opposite end secured to said holding means, wherein said sheath means includes a sheath slidably received over said shaft and having said tapered valve seat at one end of said sheath and having an opposite end secured to said holding means.

20. Apparatus in accordance with claim 19, wherein said adjusting means includes an adapter member slidably received over said opposite end of said shaft and fixedly attached to said opposite end of said sheath; a threaded adjustment member which is threadably engaged with said opposite end of said shaft and which is connected rotatably, in longitudinally fixed relation to said adapter member; and key and keyway means cooperable between said shaft and said adapter member for permitting relative longitudinal movement between said shaft and said adapter member and for preventing relative rotation between said shaft and said adapter member.

21. Apparatus in accordance with claim 19, wherein said adjusting means includes key and keyway means cooperable between said shaft and said sheath for permitting relative longitudinal movement between said shaft and said sheath and for preventing relative rotation between said shaft and said sheath, and a threaded adjustment member having a first portion threadably engaged with said opposite end of said sheath by threads of a first pitch and having a second portion threadably engaged with said opposite end of said shaft by threads of a different pitch.

22. A Joule-Thomson cryostat comprising a substantially cylindrical core shaft with a substantially frustro-conical tip at one end of said core shaft, said tip having a free extremity of smaller cross dimension than a base portion of said tip; a tubular sheath slidably received over said core shaft and having at one end an internal peripheral valve seat surrounding, in spaced relation, a lengthwise portion of said tip, said valve seat tapering from a larger cross dimension toward said base portion of said tip to a smaller cross dimension toward said free extremity of said tip, whereby opposing surfaces of said tip and said valve seat define a converging annular passageway terminating at an annular expansion opening adjacent said free extremity of said tip; means for holding respective ends of said core shaft and said sheath opposite said one ends thereof in selected relative longitudinal positions; and coolant fluid tubing means helically wrapped about said sheath and having an end in communication with said converging annular passageway for supplying high pressure coolant fluid to said passageway at a location upstream of said expansion opening, said core shaft having a coefficient of thermal expansion less than that of said sheath, whereby the effective flow area of said passageway is adjustable by relative longitudinal movement of said tip and said valve seat as a result of differential expansion and contraction between said core shaft and said sheath in response to changes in temperature of said coolant fluid.

23. A cryostat in accordance with claim 22, wherein said frustro-conical tip defines an apex angle in the range from about 5° to about 30° and wherein said tapered seat defines an included angle in the range from about 5° to about 30° and is substantially complementary to said tip.

24. A cryostat in accordance with claim 23, wherein said apex angle and said included angle are equal.

25. A cryostat in accordance with claim 23, wherein said apex angle is slightly less than said included angle.

26. A cryostat in accordance with claim 25, wherein said apex angle is from about ¼° to about 1° less than said included angle.

27. A cryostat in accordance with claim 22, including labyrinth spoiler means for causing degradation in coolant fluid flow through said passageway.

28. A cryostat in accordance with claim 22, wherein said tip includes means for capturing contaminants contained in said coolant fluid.

29. A cryostat in accordance with claim 28, wherein said capturing means includes a circumferential groove in said tip.

30. A cryostat in accordance with claim 29, wherein said sheath has an opening aligned with said circumferential groove and wherein said end of said tubing means is connected to said opening.

31. A cryostat in accordance with claim 22, wherein said sheath has an opening in communication with said passageway and wherein an annular adapter is attached to the outer periphery of said sheath, said adapter having an internal peripheral channel in communication with said opening in said sheath and having an inlet opening in communication with said channel, said end of said coolant fluid tubing means being connected to said inlet opening.

32. A cryostat in accordance with claim 22, wherein said holding means includes means for adjusting said selected positions to calibrate the effective flow area of said passageway.

33. A cryostat in accordance with claim 32, wherein said adjusting means includes a substantially tubular adapter member slidably received over said opposite end of said core shaft, said adapter member having a forward end portion of enlarged internal diameter in which said opposite end of said sheath is secured; means for sealing between the outer periphery of said core shaft and the inner periphery of said tubular adapter member; means for preventing relative rotation between said core shaft and said adapter member and for permitting relative longitudinal movement therebetween; and a threaded adjustment member threadably engaged with a threaded portion of said opposite end of said core shaft and rotatable about an axis of said core shaft, said adjustment member being rotatably coupled to said adapter member but longitudinally fixed relative to said adapter member.

34. An assembly in accordance with claim 33, wherein said threaded portion of said opposite end of said core shaft is received within a threaded axial bore extending through a rear end portion of said adjustment member and wherein said adjusting means further includes a locking cap having a shaft portion threaded into said bore rearward of said threaded portion of said opposite end of said core shaft, said shaft portion of said locking cap abutting an extremity of said opposite end of said core shaft.

35. An assembly in accordance with claim 32, wherein said opposite end of said sheath is threaded at a first pitch and said opposite end of said core shaft is threaded at a second pitch different from said first pitch, wherein said adjusting means includes key and keyway means cooperable between said core shaft and said sheath for slidably coupling said sheath to said core shaft and for preventing relative rotation between said sheath and said core shaft, and wherein said adjusting means further includes an adjustment member having a first portion threadably engaged with said opposite end of said sheath and a second portion threadably engaged with said opposite end of said core shaft.

* * * * *